United States Patent [19]

Booth et al.

[11] 4,189,380

[45] Feb. 19, 1980

[54] SALT ADDITION IN ULTRAFILTRATION PURIFICATION OF SOLUTIONS OF POLYMERIC COLORANTS

[75] Inventors: Robin G. Booth, Palo Alto; Anthony R. Cooper, Los Altos, both of Calif.

[73] Assignee: Dynapol, Palo Alto, Calif.

[21] Appl. No.: 743,204

[22] Filed: Nov. 18, 1976

[51] Int. Cl.$^2$ .................... C09B 1/20; C09B 3/10; C09B 5/14; C09B 39/00

[52] U.S. Cl. .................... 210/23 F; 260/144; 260/159; 260/208; 260/369; 260/377; 260/556 B; 260/561 R; 260/583 H; 260/691; 260/704; 546/68

[58] Field of Search ............... 260/144, 208, 369, 377, 260/278, 691, 169, 704; 210/321, 433 M, 23 F; 546/68

[56] References Cited

U.S. PATENT DOCUMENTS

| | | | |
|---|---|---|---|
| 2,253,789 | 8/1941 | Kern et al. | 260/276 |
| 2,335,680 | 11/1943 | Klein | 260/377 |
| 2,354,588 | 7/1944 | Gainey | 260/208 |
| 2,564,225 | 8/1951 | Mayers | 260/205 |
| 3,526,588 | 9/1970 | Michaels et al. | 210/23 |
| 3,679,661 | 7/1972 | Babson | 260/233.3 R |
| 3,920,855 | 11/1975 | Dawson et al. | 260/144 X |
| 4,088,572 | 5/1978 | Cooper et al. | 210/23 F |
| 4,089,778 | 5/1978 | Gauger | 210/23 F |

OTHER PUBLICATIONS

Porter et al., Chem. Tech., vol. 1, pp. 56 to 63 (Jan., 1971).
Weissberger (II), Technique of Organic Chemistry, vol. III, p. 565 (1950).
Perry, "Progress in Separation and Purification", vol. 1, pp. 297 to 334 (1968).

*Primary Examiner*—Floyd D. Higel
*Attorney, Agent, or Firm*—William H. Benz; Norman H. Stepno

[57] ABSTRACT

The ultrafiltration purification of aqueous solutions of polymeric colorants, wherein low molecular weight impurities are removed in an ultrafiltrate leaving a purified polymeric colorant-bearing retentate, is carried out with improved efficiency when, during at least two diavolumes of ultrafiltration, the salt content of the retentate is maintained above about 1% by weight.

15 Claims, No Drawings

SALT ADDITION IN ULTRAFILTRATION PURIFICATION OF SOLUTIONS OF POLYMERIC COLORANTS

BACKGROUND OF THE INVENTION

This invention relates to an improvement in an ultrafiltration process for purifying solutions of polymeric colorants.

U.S. Pat. No. 3,920,855 of Dawson et al, issued Nov. 18, 1975 and copending patent application, Ser. No. 520,530, filed Nov. 4, 1974 by Gless et al now U.S. Pat. No. 4,018,826, issued on Apr. 19, 1977 and Ser. No. 638,730, filed Dec. 8, 1975 by Wingard et al, and now U.S. Pat. No. 4,051,738, and Japanese Patent Applications of Tanabe Seiyaku such as 41-14433, 41-14434 and 44-13382 disclose that colors can offer advantages in polymeric form. U.S. patent application Ser. No. 727,097 filed on Sept. 27, 1976 by Ned Weinshenker, and now abandoned, further discloses that ultrafiltration is useful to purify polymeric colorants and free these colorants from undesired monomeric and low molecular weight polymeric impurities. The present invention concerns a way to improve the efficiency of this purification.

STATEMENT OF THE INVENTION

It has now been found that the ultrafiltration purification of polymeric colorant solutions proceeds with improved efficiency when salt is added to the solution in an amount sufficient to maintain the salt content above 1% w. More particularly, it has been found that when an aqueous feed solution made up of polymeric colorant of molecular weight above 1000 Daltons, and polymeric colorant, colorant precursors, colorant degradation products, salts and the like impurities of molecular weight below 1000 is contacted with a semipermeable membrane under ultrafiltration conditions in a diafiltration mode for a plurality of diavolumes thus causing separation of the feed solution into an ultrafiltrate enriched in impurities and a retentate enriched in polymeric colorant of molecular weight above 1000 Daltons, the desired separation occurs with improved efficiency when during at least two diavolumes the salt content of the feed is maintained above 1% w by the addition of salt.

DETAILED DESCRIPTION OF THE INVENTION

In accord with the present invention, ultrafiltration purification of polymeric dye solutions, especially the solutions which occur during the preparation of polymeric dyes, proceeds with improved efficiency when salt is added to and maintained in the solution during at least a portion of the ultrafiltration.

The solutions to which the present invention relates, called "feed solutions," are aqueous solutions. That is, they have a predominantly (greater than 50% w) water solvent. The solvent is from 50 to 100% water with the remainder comprising organics such as alcohols, glycols, ethers, liquid organic amines such as pyridine, and the like. Water and water containing from 0 to 35% pyridine are preferred solvents.

The feed solutions contain from 0.1 to 10% w (basis total solution) of polymeric colorant of molecular weight above 1000 Daltons. These colorants are composed of a plurality of units of chromophore covalently linked to or into a polymeric backbone. A number of typical polymeric colorants are illustrated in the examples. Preference is given to polymeric azo and anthraquinone colorants. Preferably, the feed solutions contain from 0.2 to 9% w of polymeric colorants of molecular weight above 1000 Daltons with amounts in the range of 0.5 to 8% w being most preferred.

The feed solutions used with the present invention most commonly are the crude or partially purified reaction products of the polymeric colorant preparation. As such they contain polymeric dye precursors as impurities as well as low (less than 1000 Dalton) molecular weight polymeric colorants. They generally additionally contain salts, usually inorganic salts of neutralization formed during the polymeric colorant preparation. Also, these solutions can contain degradation products which form during polymeric colorant preparation and byproducts. These organic impurities have the property of being of molecular weight below 1000 Daltons. They are present in the feed solution at a concentration of from 0.04 to 10% w (basis solution) which is from about 0.5 to 100% w (basis polymeric colorant). Preferably the organic impurities are present in an amount of from 1 to 75% w (basis colorant) and more preferably are present in amounts of from 1 to 65% w (basis colorant). Inorganic salt impurities can initially range from 10 to 400% wt, basis colorant, with levels from 20 to 200% being preferred and levels from 30 to 150% being more preferred. It is of especial interest to remove the organic impurities (and in many cases the inorganic impurities) as completely as possible when the finished product is to be used as a nonabsorbable colorant for edibles since, as a rule, materials of molecular weight below about 1000 Daltons are absorbable from the gastrointestinal tract into the body and materials above this weight are not absorbable. Final organic impurity levels of less than 5000 ppm (basis colorant) are preferred.

In the ultrafiltration process to which the present invention relates, the feed solution is contacted with a semipermeable membrane. This contacting is effected under "ultrafiltration conditions" which conditions are defined to include a positive upstream pressure of from 25 to 200 psig, preferably 50 to 150 psig and more preferably 75 to 125 psig, a temperature of 10° to 100° C., preferably 15° to 90° C. and more preferably 15° to 80° C.

The semipermeable membranes employed in the ultrafiltration are asymmetric semipermeable membranes, preferably anisotropic asymmetric membranes. Preferably, these membranes have a lower exclusion limit of from 5000 to 100,000 Daltons. These membranes may take the form of thin channel or wide channel passages or hollow permeable fibers through which the feed solution is passed. The exact composition of these membranes is not a part of this invention. Suitable membranes may be obtained commercially from a number of sources including AMICON Corporation, Cambridge, Mass., Romicon Corporation, ABCOR, T. J. Engineering Corporation and Union Carbide Corporation. Examples of suitable membrane materials are Amicon's anisotropic membranes sold under the designation PM-10, PM-30, and XM-50; ABCOR's FEG membranes Types D or M and HFA 100, 200 and 300; T. J. Engineering's Osmotics, Inc. SEPA membranes and Carbide's UCARSEP membranes.

In the ultrafiltration process to which this invention pertains, the feed solution is contacted with such membranes under "ultrafiltration conditions" as such term has been above defined. A portion of the feed solution passes through the membrane. This fraction is called "the ultrafiltrate"; the portion which does not pass is "the retentate." It is common in ultrafiltration to effect a plurality of contactings of the feed solution with the membrane. In a batch operation this may be done by refeeding or recycling the retentate. In a continuous operation this may be effected by recycle or by employing several membrane modules in series. With each contacting there is removal of solvent as ultrafiltrate. It is common to add makeup solvent to the retentate to compensate for the solvent passing as ultrafiltrate. This addition permits a uniform viscosity, polymer concentration and the like to prevail during ultrafiltration. This mode of operation, wherein makeup solvent is added, is called diafiltration. The present invention relates to this type of operation and calls for the addition of salt so as to maintain a salt level when operating in a diafiltration mode.

A common method to measure the amount of ultrafiltration effected is to measure the number of diavolumes passed in a diafiltration mode. One diavolume is a volume equal to the original feed volume. That is, if an initial feed volume is one gallon and during ultrafiltration three gallons of ultrafiltrate is passed, and three gallons of makeup solvent is added, leaving a final volume of one gallon, this would be equal to three diavolumes.

As will be apparent, if a material passes through the ultrafiltration membrane during diafiltration and is not replenished in makeup solution, its concentration will drop. Salts, when present, are of a size which passes through ultrafiltration membranes. It is the essence of the present invention to maintain above a certain level the concentration of salt in the retentate resulting from the ultrafiltration purification of a polymeric dye solution during at least two diavolumes of ultrafiltration, preferably during from 3 to 20 diavolumes and more preferably during from 4 to 15 diavolumes. This can be effected either by loading the initial feed with an amount of salt sufficient to maintain the required minimum salt level throughout the diafiltration or, and this is generally preferred, by maintaining the salt concentration by adding salt with the diafiltration makeup solution. A combination of these two methods may be used as well.

The salt level which should be maintained in accord with the present invention is 1% by weight or greater (basis solution) preferably 1 to 5%, and more preferably 1.25 to 4%. The reasons for the advantages of this salt maintenance are not known with certainty. In a sentence, if salt level is maintained, the removal of impurities into the ultrafiltrate from a polymeric colorant solution proceeds with markedly superior efficiency than if the salt level is not maintained.

The "salts" which are added in accord with the present invention are inorganic salts of alkali metals or alkaline metals especially their halides (preferably chlorides and bromides) and nitrates. Sodium chloride gives fine results. For reasons of economy, it is the most preferred salt. The salt is added by conventional means. Most commonly the salt is added as a concentrated solution or by dissolving solid salt in the retentate. The salts are conveniently added as part of the makeup solvent during diafiltration.

During the diafiltration with salt addition the low molecular weight impurities pass out in the ultrafiltrate. When these materials have reached a satisfactorily low level, it is acceptable to perform several, i.e., 1 to 10, preferably 1 to 5, additional diavolumes of diafiltration without salt addition so as to effect removal of salt. Also, it is acceptable to perform additional ultrafiltration on the retentate without makeup addition so as to remove solvent and effect a concentrating of the retentate.

The present invention has proven useful in the ultrafiltration purification of a wide range of polymeric colorants. These colorants can be classified as anion-solubilized water-soluble polymeric dyes. That means that the dyes have anionic solubilizer groups, such as $SO_3^-$, $PO_3^{--}$ and/or $CO_2^-$, in their structures. These colorants have nonchromophoric backbones to which are covalently bound chromophoric groups, such as azo anthraquinone, xanthene, indigoid, and triphenylmethane chromophore groups. The solubilizer groups are attached to the backbone or to the chromophore, i.e.,

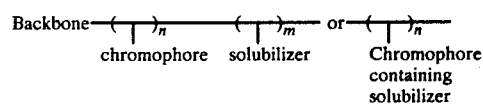

Example V illustrates the first type while Example I illustrates the second type.

While the salt maintenance of the present invention is believed to be beneficial in the purification of polymer colorants generally, it has been observed to have the greatest positive effect with polymeric azo colorants. The preferred azo colorants thus comprise a preferred class of materials upon which to practice the present invention.

It is often of advantage to add and/or maintain additional materials to/in the ultrafiltration feed. Two materials in particular deserve mention.

The first is pyridine. When purifying polymeric anthraquinone colorants, adding and maintaining from about 1 to about 20% by volume of pyridine in the retentate during the period that salt is being maintained can have an advantageous effect on the role of purification. With the anthraquinones, the use of pyridine and salt is superior to using salt alone. (Pyridine addition is the subject of copending and concurrently filed U.S. Ser. No. 743,206 of Cooper et al, and now U.S. Pat. No. 4,088,572).

The second material is base. With polymeric azo dyes, it has been observed that maintaining the pH of the retentate above 9, preferably from 11 to 13 during the period of salt maintenance, often has an advantageous effect on purification rate. With polymeric anthraquinone dyes it is even more advantageous to maintain the pH within these ranges. With anthraquinones, it is most preferred to add both pyridine and base along with salt. Suitable bases include the alkali and alkaline earth metal hydroxide and ammonium hydroxide especially KOH, NaOH and $NH_4OH$. (Base maintenance is the subject of copending and concurrently filed U.S. Ser. No. 743,207 of Cooper et al.).

The improved process of this invention will be further described with reference to the following Examples. These are intended to illustrate the general principles of the invention and are not to be construed as limiting the invention's scope which is solely as defined by the appended claims.

EXAMPLE I

This example illustrates the advantageous addition of salt during the ultrafiltration of the yellow orange color of the formula

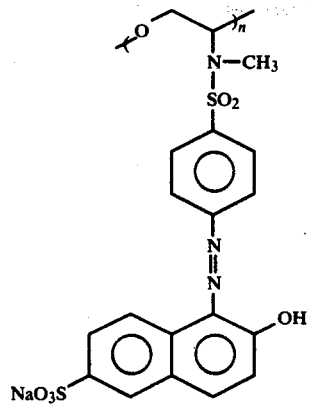

A. Colorant Precursor Preparation

A 5% solution in Dry DMF of polyepichlorohydrin (Hydrin ® 100) is prepared. An amount of this solution to provide 287 g of polyepichlorohydrin is stirred at 18° C. while 922 g of solid salt,

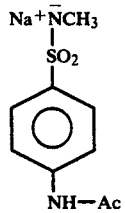

is added. The mixture is heated gradually to about 100° C. over a five-hour period. The mixture is stirred overnight. The next morning the product is dumped into pH 10 water to precipitate. The very wet solid is collected and dried in a 40° C. vacuum oven to give 770 g of a polymeric colorant precursor of the formula

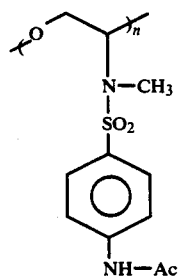

B. Colorant Production

The polymer of Part A (602 g) is dissolved in 2250 ml of concentrated hydrochloric acid at 50° C., about 1.5 liters of water is added and the mixture is refluxed for two hours to yield the polymeric amine.

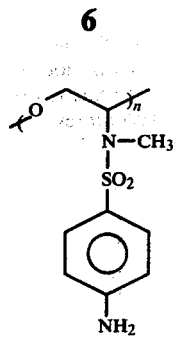

The solution is cooled to 0°–5° C. and 178 g of sodium nitrite is added in a liter of water to diazolize the amine group and yield a solution of the polymer amine. This solution is slowly run into a 38 liters solution of Schaeffers salt (628 g) of pH 10–13. Aqueous base is added along with the acidic polymer solution to maintain this pH. The resulting product is a solution of the polymeric colorant

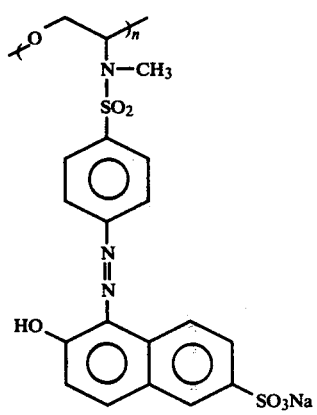

This solution (6.2 liters) containing 10.4% total solids about 0.5% by weight polymeric colorant of molecular weight above 1000 Daltons; about 0.5–1.5% by weight of organic impurities of molecular weight below 1000 Daltons, particularly monomeric sunset yellow and Schaeffer's salt; about 9.0% by weight of inorganic salts, basis total solution, is used as an ultrafiltration feedstock.

Ultrafiltration is carried out in a Romicon ultrafiltration unit equipped with a linear thin-channel membrane tube. The membrane chosen for use is an Amicon PM-10 anisotropic membrane having a 10,000 nominal molecular weight cutoff. The feed is circulated past the membrane at about 13 gpm with an inlet pressure of 90 psig. The temperature is slightly elevated 30°–40° C. The feed solution is diluted to 10 liters (10 liters is defined to be one diavolume), adjusted to pH 12.4 and charged to the ultrafiltration unit. Ultrafiltration is begun in a diafiltration mode, that is adding liquid to the retentate in an amount equal to the amount of ultrafiltrate removed. During an initial 5 diavolumes of ultrafiltration, pH 11.9 is used as makeup. The amount of salt in the feed is great enough to assure that a salt level of 1% is maintained until just before the end of the fifth diavolume. The ultrafiltrate is colored as low molecular weight impurities are removed into the ultrafiltrate.

After 5 diavolumes, instead of aqueous base, deionized water is used as makeup. Five additional diavolumes are carried out. It is observed that the passage of color into the ultrafiltrate slows down and virtually stops by the end of this period, during which the salt content of the retentate has dropped well below 1%. Then, 5 additional diavolumes of ultrafiltration are carried out, using a pH 11 1-½% w NaCl solution as makeup. Color is again observed, indicating that the ultrafiltration is now efficiently removing impurities. By the end of 5 further diavolumes, the color is no longer passing. Then additional diavolumes of ultrafiltration are carried out to remove added NaCl and bring the solution to about pH 7, the makeup water is turned off and the retentate is concentrated. The retentate is later recovered.

Analysis of the final product shows that it is a purified polymeric colorant containing less than 1% of organic impurities of molecular weight below 1000 Daltons (basis colorant) and less than 1% of inorganic salts (basis colorant).

The ultrafiltered product can be used as is or may be evaporated to dryness. The product is useful for coloring edibles, where it exhibits substantial nonabsorption from the GI tract because of its low content of low molecular weight impurities and also for coloring fibers, paper, and the like.

EXAMPLE II

This Example illustrates the advantageous addition of base during the ultrafiltration purification of the polymeric azo colorant of the formula

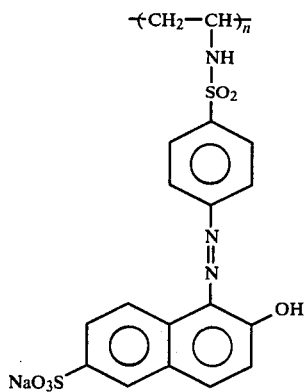

This material formed by the general method of reacting a preformed polymer, polyaminoethylene, with a chromophore precursor and converting the precursor to the chromophore. In this Example, Parts A, B, and C relate to the backbone preparation, Parts D, E, and F relate to the chromophore attachment, and Part G relates to ultrafiltration.

A. Preparation of Vinylacetamide

To 462 g of acetamide (technical) is added 12.45 ml of 6 M aqueous sulfuric acid followed immediately by 168 ml (3 moles) of acetaldehyde (99+%). This mixture is stirred and heated until the internal temperature reaches 70° C. (19 minutes). After another minute of heating, the 95° C. clear solution spontaneously crystallizes, causing a temperature rise to 106° C. The reaction product, ethylidene-bis-acetamide, is not separated. Heating and stirring are continued for another 5 minutes and a mixture of 60 g calcium carbonate (precipitated chalk) and 30 g soft glass powder is added. The resulting mixture is heated to cracking temperature and distilled at 40 mm Hg (200° C. bath temperature). When the internal temperature reaches 160° C. (0.5 hr.), the receiver is changed. After another 1.7 hr the distillation is almost over, the stirrer is stopped and the heating continued. Slow distillation continues for another hour and is then stopped. The first distillation fraction is 95.9 g of water and acetamide. The second fraction is 466 g of orange oil and crystals. NMR indicates this mixture to contain 195 g vinylacetamide (76% yield), 217 g acetamide, and 54 g ethylidene-bis-acetamide.

B. Polymerization of Vinylacetamide

A red-brown solution of 460 g of vinylacetamide, 557 g acetamide, and 123 g ethylidene-bis-acetamide, (one-half of five combined vinylacetamide preparations in accord with part A) in 570 ml methanol is filtered through 250 g of Amberlite® IRC-50 ion exchange resin over an eight hour period. The column is rinsed with 1,000 ml methanol. The combined column eluant is stripped to its original volume of 1,667 ml, treated with 7.75 g of AIBN polymerization catalyst (1 mole %), deoxygenated, and stirred under argon at 65° C. for 15 hours to polymerize. Solid polymer is precipitated from the resulting very thick solution by addition to 15 liters of acetone. The polymer is collected by filtration, washed with acetone and dried in a vacuum oven (80° C.) for two days to afford 459 g of crude poly(-vinylacetamide) contaminated with acetamide as a yellow, semi-granular solid having molecular weight of 200,000 as determined by Gel Permeation Chromatography, using dimethylformamide as eluent and polystyrene as standards.

C. Hydrolysis of Poly(vinylacetamide) to Poly(vinylamine hydrochloride)

The crude poly(vinylacetamide) obtained in part B (459 g) is dissolved in 1,000 ml water with heating. Concentrated hydrochloric acid (1,000 ml) is added and the resulting dark brown solution is stirred and heated at a gentle reflux (97°-106° C.) for 19 hours. A precipitate forms and is redissolved by addition of 200 ml water. Reflux is continued and over the next 8 hours 1,000 ml water is added in several portions to maintain solubility of the polymer. After a total of 27 hours at reflux, the polymer is precipitated by the addition of 1,000 ml concentrated hydrochloric acid. The mixture is cooled to 18° C. and the thick polymeric gum isolated by decantation and dried under vacuum at 50°-75° C. with occasional pulverization for 40 hours to give 332 g of poly(vinylamine hydrochloride) as a brown granular solid (77% yield from vinylacetamide, 59% from acetaldehyde). Steps B and C are repeated and the products are pooled.

D. Conversion of Poly(vinylamine hydrochloride) to Sulfoamido Adduct.

12.5 Grams of the poly(vinylamine hydrochloride) of part C is added with 1.0 liters of water to a 12 liter stirred flask. The pH is raised from 2.5 to 10.0 by addition of 0.8 N NaOH. Then 350 ml of tetrahydrofuran is added to yield a solution of the free amine.

Next, 404 grams of N-acetylsulfanilyl chloride is added slowly, pH being controlled at 9.0-9.5 by NaOH addition. 1250 Ml of THF is added to maintain a solution. Additional NaOH is added to carry the pH to 10.5-11.0. THF is stripped off under vacuum. A precipitate forms and is collected and found to be the polymer

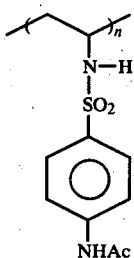

This reaction is repeated five times.

E. Hydrolysis

The individual products of the six runs of part D are hydrolyzed.

To a flask is added one of the reaction products, 2.9 liters of water, and 786 ml of concentrated hydrochloric acid. The acid is refluxed for six hours to yield a solution of the amine

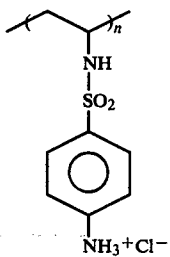

(This reaction is repeated with each product of part D.)

F. Diazotization and Coupling

One of the solutions of part E containing 1.6 equivalents of polymer is cooled to 20° C. 377 Ml of 5 N NaNO₂ is added with stirring. The mixture is stirred for 30 minutes. The solution is then transferred to a solution of 484 g (1.15 equivalents) of Schaeffer's salt in 4.5 liters of water and 12.8 equivalents of NaOH at a temperature of about 5°-10° C. (maintained by ice addition). This solution is stirred for 45-60 minutes. NaOH is added to pH 12. About 18 liters of crude reaction product containing about 4% w of the polymeric "Sunset Yellow" colored dye,

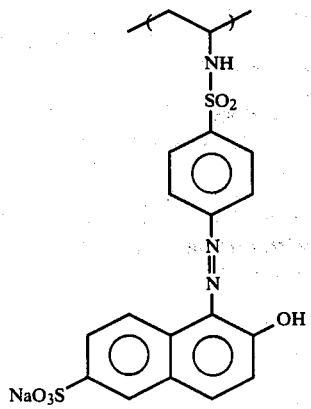

is obtained. This is repeated with each product of Part E. The coupled products contain in solution:

| | | |
|---|---|---|
| Polymeric colorant of Molecular wt above 1000 Daltons | 1.5-2 | % w, basis total solution |
| Organic impurities plus Polymeric colorant of molecular wt below 1000 Daltons, | 0.2-0.6 | % w, basis solution |
| | 15-30 | % w, basis polymeric colorant |
| Inorganic salts | 2-3 | % w, basis solution |
| | 100-150 | % w, basis polymeric colorant |

G. Ultrafiltration

Ultrafiltration is carried out in the apparatus described in Example I using an Amicon PM-30 anisotropic membrane having a 30,000 molecular weight cut off. First, experimental studies similar to those of Example I are conducted on one solution of part F. The solution is adjusted to pH 12.5 and filtered to remove solids and charged to the Romicon unit feed tank. The unit is run without makeup addition until the retentate volume is reduced to a level that the concentration of polymeric dye is about 3% by wt. Then the unit is run in a diafiltration mode. When deionized water is added as the makeup after as many as 22 diavolumes there are still >1% (basis colorant) of low molecular weight organic impurities present in the retentate. When this run is repeated, adding 2% w salt (NaCl) to the makeup water pH 7 a problem develops—the colorant tends to "salt out." Base is added to pH 9-10 and this is solved. After 9-10 diavolumes with this makeup, the product is free of organic impurities of molecular weight below 1000 Daltons as determined by gel permeation chromatography analysis.

The retentate is further filtered using water as makeup the remove residual inorganic salts and base, thus yielding a product which contains less than 1% by wt (basis total colorant) of organic impurities of molecular weight below 1000 Daltons;

and about 1% by wt (basis total colorant) of salts—this last value could be easily reduced by further water diafiltration.

The ultrafiltration is repeated using pH 9-10 water as makeup. While this is more efficient than pH 7 water, it is less efficient than when salt is present.

EXAMPLE III

A polymeric colorant of the formula

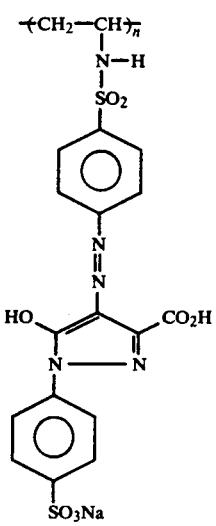

is prepared following the general methods of Example II. Eight preparations are carried out. The backbone of parts A, B, and C of Example II is employed. The conversion, hydrolysis and diazotization of parts D and E are used. In the coupling of part F, instead of Schaeffer's salt, a similar molar amount of Pyrazolone T,

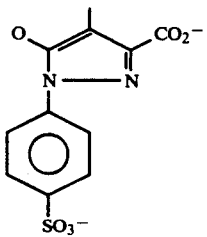

is used.

The crude reaction mixture is filtered to remove solids and charged to the ultrafiltration unit of Example 1 equipped with a PM-30 membrane. Water is removed to give a total volume of 10 liters. These concentrated crude products have the following composition (ranges reflect variation among the eight preparations).

| | |
|---|---|
| Polymeric colorant of molecular weight above 1000 Daltons | 2.5–3.6%, basis solution |
| Polymeric colorant of molecular weight below 1000 Daltons | *At least 0.6–0.9% basis solution |
| Colorant precursors and other organic impurities of molecular weight below 1000 Daltons | *At least 25% (basis colorant) |

*As determined by analysis for two specific low molecular weight impurities.

The products are then ultrafiltered in a diafiltration mode using pH 10–1% KCl makeup. After about three diavolumes of ultrafiltration one impurity, pyrazolic acid, is absent, after about 8 diavolumes, monomeric tartrazine impurity is below the detection limit (1%, basis colorant) of the analytical method. Following the diafiltration with added salt, additional diafiltration is carried out with water makeup. This removes the added salt, and yields a purified product. Ultrafiltration inlet pressure is 100 psig. Temperature is 38°–50° C.

When the crude material is ultrafiltered without salt addition, it is observed that the removal of low molecular weight impurities drops in efficiency so that after 20 diavolumes measurable low molecular weight impurities are present.

EXAMPLE IV

Two major low molecular weight organic contaminants in the ultrafiltration feed material of Example I are monomeric sunset yellow and Schaeffer's salt. In a separate study, the rate of removal of these materials from a model colorant solution is measured. The passage of tartrazine, a monomeric contaminant of the material of Example III, is also studied. A PM-10 membrane is used at essentially the conditions employed in Example I with the following results:

| | Liquid Phase | |
|---|---|---|
| | Deionized Water pH 7 | 1.0–5.0% NaCl pH 7 |
| Material | Number of Diavolumes to halos concentration | |
| Sunset Yellow | | |
| 750 ppm | 6–7 | 1.5 |
| 200 ppm | 6–7 | 1.5–2 |
| 20 ppm | 6–7 | 1–1.5 |
| Schaeffer's Salt | 2–3 | 1–1.5 |
| 1000 ppm | | |
| Tartrazine | 4–6 | 1–1.5 |
| 1000 ppm | | (2% NaCl) |
| 10 ppm | | 1–1.5 |

EXAMPLE IV

A. Preparation of Copolymer Backbone

To 2304 g of acetamide (technical) in a 12-liter reaction flask is added 62.2 ml of 6 M aqueous sulfuric acid followed immediately by 661 g of acetaldehyde (99+%). This mixture is stirred and heated until the internal temperature reaches 78° C. (11 minutes) at which point the clear solution spontaneously crystallizes, causing a temperature rise to 95° C. The reaction product, ethylidene-bis-acetamide, is not separated. Heating and stirring are continued for another 5 minutes to a temperature of 107° C. and a mixture of 150 g calcium carbonate (precipitated chalk) and 150 g of Celite$^R$ diatomaceous earth powder is added. A first distillate fraction of water and acetamide is removed. The remaining materials are cracked at 35 mm Hg and 185° C. A fraction made up of vinylacetamide and acetamide is taken overhead, analyzed by NMR and found to contain 720 g of vinylacetamide and 306 g of acetamide. A portion of this pooled material is dissolved in isopropanol, cooled, and filtered to yield a stock solution. This stock solution is analyzed and found to be 4.1 molar in vinylacetamide.

Into a five-liter flask is added 505 ml (272 g) of a vinylacetamide solution obtained by stripping isopropanol from 900 ml of the above stock solution (containing 3.69 mole of vinyl acetamide). AIBN (15 g) in 1500 ml of water is added followed by 1279 g of 25% w sodium vinyl sulfonate in water (Research Organic Corp.) and one liter of water. This is 2 equivalents of sulfonate per 3 equivalents of vinylacetamide. Following deoxygenation, the mixture is heated to 65° C. and there maintained with stirring for 3 hours. This reaction mixture is then reduced to ⅓ volume solid. AIBN is removed and the liquid added to 8 gallons of isopropanol. The copolymer precipitate is collected and dried in vacuum to yield 865 g of solid copolymer (mol wt $16 \times 10^4$). Whenever an experimental molecular weight is given in this specification, it is derived by gel permeation techniques. In the primary technique, a silanized porous glass support is used with a 0.01 M LiBr in DMF eluant. Detection is by refractometer with standardization being based on suitable purchased poly(styrene or poly(styrenesulfonate) standards.

Into a two-liter flask is added 863 g of the just-noted solid product, 2.5 liters of water and one liter of concentrated hydrochloric acid. The mixture is refluxed (99°–110° C.) for about 24 hours, and cooled. The solid precipitate is washed, and dissolved in 3 liters of 10% NaOH. This reaction mixture is added to about twelve liters of methanol to give 400 g of fine solid precipitate.

B. Preparation of Chromophore

Into a 5-liter kettle is charged 750 g of 1-amino-2-methyl-4-bromo-anthraquinone (Sandoz AMBAX), 1550 g of ethylacetoacetate, 580 g of nitrobenzene, and 19.6 g of sodium acetate. The mixture is deoxygenated and heated to 150+ over about 4 hr. During the last 2.5 hr, 385 ml of distillate is collected. The product is cooled, collected on a filter and washed with acetone and water and dried to yield 830 g of the chromophore.

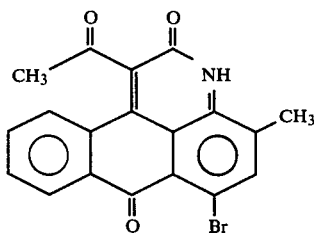

C. Attachment of Chromophore

300 Gram of the copolymer of Part A is dissolved in 4.2 liters of 1 N NaOH, and the mixture is heated to 90° C. Then 480 g of the chromophore of Part B and 20 g of $CuCl_2$ catalyst are added. The mixture is heated at 90°–101° C. for 3.5 hr, while an additional 4 liters of NaOH and an additional 20 g of catalyst are added. The mixture is cooled by adding 10.7 kg of ice. HCl, NaOH and acetic anhydride are added to buffer the solution at pH 10.

D. Ultrafiltration

The solution of part C is prefiltered three times with an 0.25 micron filter to remove solids. This material contains polymeric anthrapyridone colorant of the formula

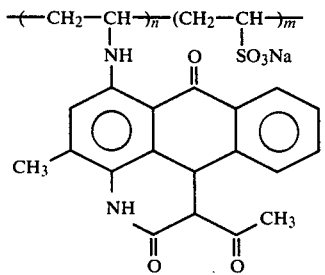

It also contains substantial unreacted chromophore, chromophore degradation products, salts, organic solvents and other impurities.

Two samples of this material are ultrafiltered using the conditions and apparatus of Example I. Both samples are brought to pH 10 and 5% pyridine is added to assure full solubility of the colorant. (The addition of pyridine is itself a separate invention and is the subject of copending patent application USSN. The salt content of the starting materials is about 3–4%.

With the first sample, a makeup of pH 10, 5% pyridine in deionized water is employed. With this makeup, the salt level decays to below 1% within about 2 diavolumes. With the second sample, a pH 10, 5% pyridine, 1½% NaCl makeup is used so that the salt level does not fall below 1%. It is observed that the rate of passage of organic impurities is faster when salt is present and that the desired purified product, containing less than 5000 ppm of organics of molecular weight below 1000 Daltons, is achieved in less diavolumes.

What is claimed is:

1. In the process for purifying a solution of a polymeric colorant wherein an aqueous feed solution comprising polymeric colorant of molecular weight above 1000 Daltons, polymeric colorant, and polymeric colorant precursors and degradation products, and inorganic salts of molecular weight below 1000 Daltons is brought in contact with a semipermeable membrane under ultrafiltration conditions in a diafiltration mode for a plurality of diavolumes thereby forming an ultrafiltrate comprising polymeric colorant, polymeric colorant precursors and degradation products and inorganic salts of molecular weight below 1000 Daltons and a retentate comprising polymeric colorant of molecular weight above 1000 Daltons, the improvement which comprises maintaining the salt content of the feed solution above 1% by weight for at least two diavolumes by addition of salt directly to said ultrafiltration feed, and said ultrafiltration feed comprising at least 50% by weight water.

2. The process of claim 1, wherein the salt content of the feed solution is maintained in the range of from 1 to 5% by weight.

3. The process of claim 1, wherein the salt content of the feed solution is maintained in the range of from 1.2 to 4% by weight for from 3 to 20 diavolumes.

4. The process of claim 3 wherein the salt is selected from the group consisting of the inorganic salts of the alkali metals and alkaline earth metals.

5. The process of claim 4 wherein the salt is an alkali metal halide.

6. The process of claim 5 wherein the polymeric colorant is a polymeric azo colorant.

7. The process of claim 5 wherein the polymeric colorant is a polymeric anthraquinone colorant.

8. The process of claim 5 wherein the semipermeable membrane is an asymmetric semipermeable ultrafiltration membrane.

9. The process for purifying a solution of a polymeric colorant which comprises: (A) Contacting an aqueous feed solution comprising at least 50% by weight water, from 0.1 to 10% by weight basis total solution of dissolved polymeric colorant of molecular weight above 1000 Daltons, from 0.04 to 10% by weight basis total solution of dissolved organic materials of molecular weight below 1000 Daltons said materials including salts, polymeric colorants of molecular weight below 1000 Daltons and polymeric colorant precursors and degradation products with a semipermeable membrane at an inlet pressure of from 25 to 200 psig, and a temperature of from 10° C. to 75° C. and a feed pH of from 9.0 to 13, thereby forming an ultrafiltrate solution rich in materials of molecular weight below 1000 Daltons, and a retentate solution rich in polymeric colorant of molecular weight above 1000 Daltons; (B) Adding directly to said retentate water and salt in an amount to maintain the water content at at least 50% by weight and the salt within the range of 1 to 5% by weight, and form a salt adjusted retentate; (C) Repeating the contacting of Step A used as feed the salt adjusted retentate thereby forming a second ultrafiltrate and a second retentate; and (D) Recovering as said second retentate, a purified solution of polymeric colorant.

10. The process of claim 9, wherein in Step A base is present in an amount necessary to yield a solution pH of from 11 to 13 and wherein in Step B base is added in an amount necessary to maintain the pH at from 11 to 13.

11. The process of claim 9 wherein steps B, C, and D are repeated from 2 to 19 times.

12. The process of claim 10 wherein the feed solution comprises the following:

| | |
|---|---|
| polymeric anthraquinone colorant of molecular weight above 1000 Daltons | 0.5-8% wt basis solution |
| polymeric anthraquinone colorant of molecular weight below 1000 Daltons and polymeric colorant precursors and degradation products of molecular weight below 1000 Daltons | 0.5 to 8% wt basis solution |
| inorganic salt | sufficient to impart a salt concentration of at least 1% to the solution. |

13. The process of claim 12 wherein the polymeric colorant comprises a copolymer of vinylamine and vinylsulfonate to which through its amine groups is covalently attached anthraquinone chromophores.

14. The process of claim 13 wherein the anthraquinone is an anthrapyridone.

15. The process of claim 14 wherein the solvent consists essentially of water.

* * * * *